Nov. 29, 1966     A. C. WICKMAN     3,287,903
POWER TRANSMISSION SYSTEM FOR A GAS TURBINE ENGINE
Filed July 14, 1964
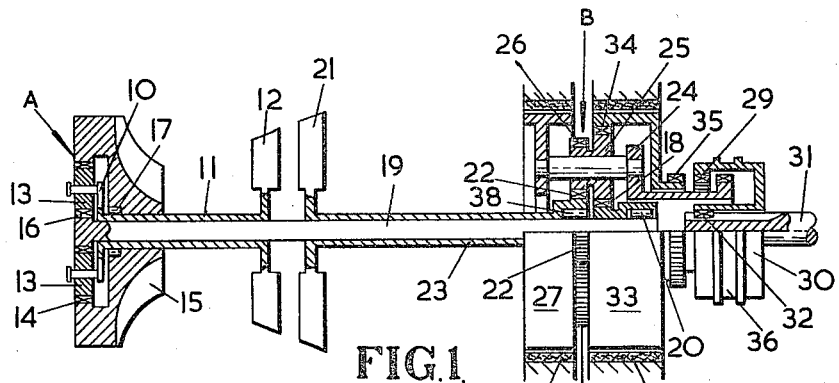
FIG. 1.
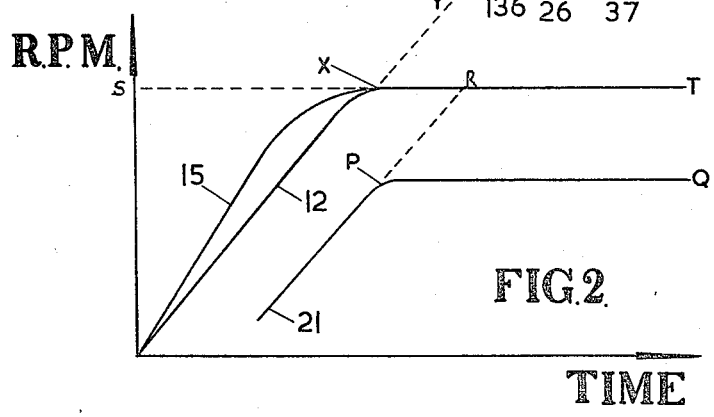
FIG. 2.
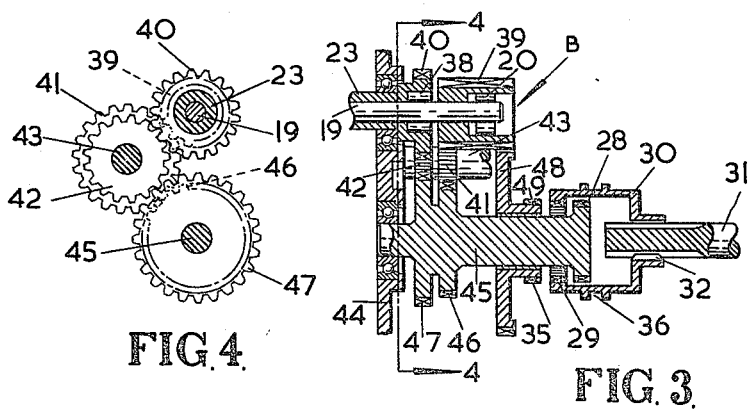
FIG. 4.
FIG. 3.

United States Patent Office 3,287,903
Patented Nov. 29, 1966

3,287,903
POWER TRANSMISSION SYSTEM FOR A
GAS TURBINE ENGINE
Axel C. Wickman, 69 S. Washington Drive,
St. Armands' Key, Sarasota, Fla.
Filed July 14, 1964, Ser. No. 382,502
Claims priority, application Great Britain, July 16, 1963,
28,083/63
9 Claims. (Cl. 60—39.16)

The invention relates to a power transmission system for a gas turbine engine of the kind including a first turbine rotor capable of driving a compressor at its full capacity, and a second turbine rotor provided with a power output shaft.

It has previously been proposed in my U.S. patent specification No. 2,981,063 to provide a power transmission system, for a gas turbine engine of the kind set forth, in which the first turbine rotor is connected to drive the compressor through a first, overdrive, epicyclic gearing of which the reaction member is drivingly connected to a drive shaft, a unidirectional clutch is arranged to prevent the first turbine rotor from rotating faster than the compressor, and the power output shaft of the second turbine rotor and the drive shaft are connected to drive a common power output shaft through a second, underdrive, epicyclic gearing which is arranged so that the power output shaft of the second turbine rotor will rotate at a ratio of, but slower than, the speed of the drive shaft. With this arrangement the differential speed between the drive shaft and the power output shaft of the second turbine rotor gives beneficial results whilst the common power output shaft is being accelerated from rest and the compressor is being accelerated up to its full capacity speed. However, during the acceleration of the common output shaft, a point will arise where the speed of the drive shaft will tend to rise above that of the first turbine rotor and will cause the unidirectional clutch to act so that the planetary motion of the first epicyclic gearing will be inhibited and the compressor and the drive shaft will rotate at the same speed as the first turbine rotor. The maximum speed of the compressor is limited, from a practicable point of view, to the speed at which it is operating at full capacity and this speed is, due to the action of the unidirectional clutch, the maximum speed of both the first turbine rotor and the drive shaft. It will therefore be appreciated that, as the second turbine rotor rotates slower than the drive shaft due to the action of the second epicyclic gearing, the maximum speed of the second turbine rotor will be less than that of the first turbine rotor, and that the power developed by the gas turbine engine cannot be increased by raising the maximum speed of either of the turbine rotors as this would cause the compressor to overspeed with an accompanying loss of efficiency.

It is an object of this invention to provide a power transmission system, for a gas turbine engine of the kind set forth, which will enable the power developed by the gas turbine engine to be increased without overspeeding the compressor and which will still confer the advantages obtained by having a differential speed between the drive shaft and the power output shaft of the second turbine rotor whilst the common power output shaft is being accelerated from rest.

According to the invention a power transmission system, for a gas turbine engine of the kind including a first turbine rotor capable of driving a compressor at its full capacity and a second turbine rotor provided with a power output shaft, has the first turbine rotor connected to drive the compressor through a first overdrive epicyclic gearing of which the reaction member is drivingly connected to a drive shaft, a first unidirectional clutch arranged to prevent the first turbine rotor from rotating faster than the compressor, a second gearing connecting the drive shaft and the power output shaft of the second turbine rotor to a common power output shaft, the second gearing arranged so that the power output shaft of the second turbine rotor will rotate at a ratio of, but slower than, the speed of the drive shaft, and a second unidirectional clutch arranged operatively between the reaction member of the first epicyclic gearing and the second gearing, whereby the speed of the second turbine rotor can increase above the ratio dictated by the second gearing by causing the second unidirectional clutch to freewheel.

According to a further feature, a third unidirectional clutch may be arranged operatively between the second turbine rotor and the drive shaft to prevent the speed of the second turbine from exceeding that of the drive shaft and, consequently, from exceeding that of the first turbine rotor.

According to another feature, the second gearing may be an epicyclic gearing comprising a planet carrier supporting a pair of unequal planet gear wheels which are drivingly interconnected and mesh respectively with a first sun gear wheel connected to be driven by the drive shaft and with a second sun gear wheel connected to be driven by the output shaft of the second turbine rotor, an annulus gear wheel meshing with one of the planet gear wheels, driving means interconnecting the planet carrier and the common power output shaft, and means for holding the annulus gear wheel rotatively-stationary.

According to yet another feature, the second gearing may comprise a first gear train interconnecting the drive shaft and the common power output shaft, and a second gear train of different ratio to the first gear train and interconnecting the output shaft of the second turbine rotor and the common power output shaft.

The invention as applied to the propulsion of a road vehicle is now described, by way of example only, in the accompanying drawings, in which:

FIGURE 1 is a diagrammatic axial section through a gas turbine engine, of the kind set forth, provided with a power transmission system according to one embodiment of the invention;

FIGURE 2 is a graph illustrating the result achieved with the power transmission system shown in FIGURE 1;

FIGURE 3 is an axial section through another embodiment of the invention; and

FIGURE 4 is a section taken on the line 4—4 of FIGURE 3.

In FIGURE 1 the first epicyclic gearing is indicated generally at A and the second gearing at B. The planet carrier 10 of gearing A is driven by a hollow shaft 11 from the first turbine rotor 12 and carries a series of planet gear wheels 13 which mesh with an annulus gear wheel 14 arranged to drive the compressor 15 and with a sun gear wheel 16. A unidirectional clutch 17 is arranged operatively between the compressor 15 and shaft 11 and is arranged so that the compressor can rotate faster than the first turbine rotor 12.

The sun gear wheel 16 is connected to a sun wheel 18 of the second gearing B by a drive shaft 19 extending co-axially through shaft 11 and by a unidirectional clutch 20 which is arranged so that the sun wheel 18 can rotate faster than the drive shaft 19. The second turbine rotor 21 is drivingly connected to a sun wheel 22 of the second gearing B by a hollow power output shaft 23 which co-axially surrounds the drive shaft 19.

In the second gearing B, a planet carrier 14 supports a series of pairs of unequal planet gear wheels 25, 26 which are formed integral and respectively mesh sun gear wheels 18 and 22. The planet carrier is rotatively fast with a clutch drum 27 and is provided with dogs 28 which can be engaged by complementary dogs 29 of a slidable coupling 30 arranged to drive a common power output shaft 31 through splines 32. A clutch drum 33 has an annulus gear wheel 34 formed on it to mesh with planet gear wheel 25, and is provided with dogs 35 which are complementary to dogs 29. The coupling 30 is provided with a groove 36 for coaction with a gear change fork and is movable, from the neutral position shown, to clutch either dogs 28 to connect planet carrier 24 to the common power output shaft 31, or dogs 35 to connect annular gear wheel 34 to the common power output shaft 31. Clutch drums 27 and 33 are provided with respective non-rotatable contractile clutch bands 136, 37 which are actuated in sympathy with the coupling 30 so that, when the planet carrier 24 is clutched to the common power output shaft 31, the clutch band 37 prevents clutch drum 33 and thus annulus gear wheel 34 from rotating whereby to provide a forward underdrive ratio, and so that, when the annulus gear wheel 34 is clutched to the common power output shaft 31, the clutch band 136 prevents clutch drum 27 and thus planet carrier 24 from rotating whereby to provide a reverse underdrive ratio.

In considering the embodiment of FIGURE 1 driving a vehicle from rest, reference will be made to the graph shown in FIGURE 2. When the vehicle is at rest with the gas turbine engine not started, the common output shaft 31, which is connected to drive the road wheels of the vehicle, will be held stationary by the resistance of the vehicle against the initiation of motion and, consequently, drive shaft 19 and sun wheel 16 will be held stationary by the action of the second gearing B.

When the gas turbine engine is started, the first turbine rotor 12 will drive the compressor 15 at an overdrive ratio and the torque reaction on sun gear wheel 16 will be applied to the road wheels through drive shaft 19 and second gearing B. At the same time, the torque generated on the second turbine rotor 21 will also be applied to the road wheels through the second gearing B. Thus, the speed of the first turbine rotor 12 will rise on the line 12 of FIGURE 2 and the speed of the compressor 15 will rise along the line 15 which is steeper than line 12 due to the overdrive action of the first epicyclic gearing A.

The torque reaction on the common power output shaft 31 will rise as the speed of turbine rotor 12 increases and will cause the vehicle to accelerate from rest and, as the speed of the vehicle increases, the speed of the second turbine rotor 21 and the speed of the drive shaft 19 will increase differentially due to the difference in size of the planet gear wheels 25 and 26. It will be appreciated that, as the drive shaft 19 accelerates, the sun gear wheel 16 will accelerate and the overdrive ratio of the compressor 15 will diminish until the latter rotates at the same speed as the first turbine rotor 12. When this occurs the unidirectional clutch 17 will lock the first turbine rotor 12, the compressor 15 and the drive shaft 19 together and, of course, the compressor characteristic 15 will coincide with the first turbine rotor characteristic at this point; point X in FIGURE 2. Whilst the speed of the first turbine rotor 12 has been increasing, the speed of the second turbine rotor 21 has been increasing at a fixed ratio to the speed of the drive shaft 19 and the speed characteristic 21 of the second turbine rotor will reach a peak P at the same time that the speed characteristic 12 of the first turbine rotor reaches point X. Without the provision of the present invention, the speed of the second turbine rotor 21 cannot be increased, for instance along the line PR, without causing the speed of the compressor 15 and the first turbine rotor 12 to increase along the line XY. Thus, if the lines SXRT represents the maximum speed of the compressor, the line PQ will represent the maximum speed of the second turbine rotor 21. However, with the present invention, the unidirectional clutch 20 will uncouple drive shaft 19 from the second gearing B when the second turbine rotor 21 tries to increase its speed along the line PR and will, accordingly, prevent the compressor characteristic from rising above line SXRT.

By enabling the speed of the second turbine rotor 21 to increase above the line PQ, the maximum power developed by the gas turbine engine will be increased.

If desired, a further unidirectional clutch 38 may be arranged between the drive shaft 19 and the power output shaft 23 to prevent the second turbine rotor 21 from rotating faster than the first turbine rotor 12.

In FIGURES 3 and 4 an alternative arrangement of the second gearing B has drive shaft 19 connected to drive gear wheel 39 through a unidirectional clutch 20 which is arranged so that gear wheel 39 can rotate faster than the drive shaft 19. The power output shaft 23 of the second turbine rotor 21 drives a gear wheel 40 coaxial with but larger than gear wheel 39.

The gear wheels 39 and 40 mesh respectively with gear wheels 41, 42 journalled on a payshaft 43 supported from a casing 44 which also supports an output shaft 45 having gear wheels 46, 47 meshing respectively with gear wheels 41 and 42. A slidable coupling 30 is arranged to drive the common power output shaft 31 through splines 32 and is provided with dogs 29 for engaging corresponding dogs 28 of output shaft 45 to provide a forward reduction ratio. A reverse gear wheel 48 is journalled from output shaft 45 by bush 49 and meshes with gear wheel 39 so that, when coupling 30 is slid axially for its dogs 29 to engage corresponding dogs 35 of reverse gear wheel 48, the drive to the common power output shaft 31 is at a reverse reduction ratio.

The gearing shown in FIGURE 3 may be provided with a unidirectional clutch 38 to prevent the second turbine rotor 21 from rotating faster than the drive shaft 19, and this gives the same result as shown in FIGURE 2, with the exception that when reverse ratio is engaged only drive shaft 19 and thus the first turbine rotor 12 is connected to drive the common output shaft 31. However, the second turbine rotor 21 will accelerate under no-load conditions until its speed matches that of drive shaft 19 when the unidirectional clutch 38 will operate and the second turbine rotor 21 will drive the common power output shaft 31 through unidirectional clutch 38, drive shaft 19 and gear wheel 39.

With the arrangements shown in FIGURE 1 and in FIGURES 3 and 4, the unidirectional clutch 38 will provide a drive from the second turbine rotor 21 to the compressor 15 in the event that the common output shaft 31 tends to over-run; a condition that takes place regularly in a road vehicle when the driver takes his foot off the accelerator pedal and the vehicle drives the engine. If the unidirectional clutch 38 is not provided, the speed of the first turbine rotor 12 and of the compressor 15 will die down to idling speed on over-run and will have to be re-accelerated before power is available.

In my previously mentioned prior patent specification the ratio given by the second gearing B is limited by the differential speed that can be tolerated between the two turbine rotors 12 and 21. However, with the present invention, the ratio can be determined solely by the torque characteristic required for the common power output shaft 31 as, when the unidirectional clutch 18 free-wheels, the differential speed between the turbine rotors 12 and 21 will be determined by their energy balances instead of by a mechanical ratio.

What I claim as my invention and desire to secure by Letters Patent of the United States is:

1. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, a first overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a second gearing operatively connected between said drive shaft and said common power output shaft for said drive shaft to drive said common power output shaft at one ratio, said second gearing being also operatively connected between the power output shaft of said second turbine rotor and said common power output shaft for said power output shaft of said second turbine rotor to drive said common power output shaft at a different ratio such that said power output shaft of said second turbine rotor will rotate slower than said drive shaft, and a second unidirectional clutch operatively arranged between said reaction member and the second gearing whereby the speed of the second turbine rotor will increase above the ratio dictated by the second gearing when said second unidirectional clutch freewheels.

2. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a planet carrier, a first sun gear wheel, a second sun gear wheel, a pair of unequal planet gear wheels supported by said planet carrier and meshing respectively with said first and said second sun gear wheels, means drivingly interconnecting said pair of unequal planet gear wheels, an annulus gear wheel meshing with one of said planet gear wheels, means adapted to hold said annulus gear wheel rotatively-stationary, said first sun gear wheel being connected to be driven by said drive shaft, said second sun gear wheel being connected to be driven by the power output shaft of said second turbine rotor, driving means connecting said planet carrier to drive said common power output shaft, said first sun gear wheel being smaller than said second sun gear wheel such that said power output shaft of said second turbine rotor will rotate slower than said drive shaft, and a second unidirectional clutch operatively arranged between said reaction member and said first sun gear wheel whereby the speed of the second turbine rotor will increase above the ratio dictated by the second gearing when said second unidirectional clutch freewheels.

3. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a planet carrier, a first sun gear wheel, a second sun gear wheel, a pair of unequal planet gear wheels supported by said planet carrier and meshing respectively with said first and said second sun gear wheels, means drivingly interconnecting said pair of unequal planet gear wheels, an annulus gear wheel meshing with one of said planet gear wheels, a first optionally-releasable brake means adapted to hold said annulus gear wheel rotatively-stationary, said first sun gear wheel being connected to be driven by said drive shaft, said second sun gear wheel being connected to be driven by the power output shaft of said second turbine rotor, a first optionally-releasable driving means connecting said planet carrier to drive said common power output shaft, a second optionally-releasable brake means for holding the planet carrier rotatively-stationary, said first brake means being engaged when said second brake means is released and said first brake means being released when said second brake means is engaged, a second optionally-releasable driving means connecting said annulus gear wheel to drive said common power output shaft, said first driving means being engaged when said second driving means is released and said first driving means being released when said second driving means is engaged, said second optionally-releasable driving means being arranged to connect said annulus gear wheel to drive said common power output shaft when said first brake means is released for providing a reverse drive to said common power output shaft, said first sun gear wheel being smaller than said second sun gear wheel such that said power output shaft of said second turbine rotor will rotate slower than said drive shaft, and a second unidirectional clutch operatively arranged between said reaction member and said first sun gear wheel whereby the speed of the second turbine rotor will increase above the ratio dictated by the second gearing when said second unidirectional clutch freewheels.

4. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a first gear train operatively connected between said drive shaft and said common power output shaft for said drive shaft to drive said common power output shaft at one ratio, a second gear train operatively connected between the power output shaft of said second turbine rotor and said common power output shaft for said power output shaft of said second turbine rotor to drive said common power output shaft at a different ratio such that said power output shaft of said second turbine rotor will rotate slower than said drive shaft, and a second unidirectional clutch operatively arranged between said reaction member and the second gearing whereby the speed of the second turbine rotor will increase above the ratio dictated by the second gearing when said second unidirectional clutch freewheels.

5. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, a first overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a second gearing operatively connected between said drive shaft and said common power output shaft for said drive shaft to drive said common power output shaft at one ratio, said second gearing being also operatively connected between the power output shaft of said second turbine rotor and said common power output shaft for said power output shaft of said second turbine rotor to drive said common power output shaft at a different ratio such that said power output shaft of said second turbine rotor will rotate slower than said drive shaft, a second unidirectional clutch operatively arranged between said reaction member and the second gearing whereby the speed of the second turbine rotor will increase above the ratio dictated by the second gearing when said second unidirectional clutch freewheels, and a third unidirectional clutch operatively arranged between the second turbine rotor and the drive shaft to prevent the speed of the second turbine rotor from exceeding the speed of the drive shaft and consequently from exceeding the speed of the first turbine rotor.

6. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a planet carrier, a first sun gear wheel, a second sun gear wheel, a pair of unequal planet gear wheels supported by said planet carrier and meshing respectively with said first and said second sun gear wheels, means drivingly interconnecting said pair of unequal planet gear wheels, an annulus gear wheel meshing with one of said planet gear wheels, means adapted to hold said annulus gear wheel rotatively-stationary, said first sun gear wheel being connected to be driven by said drive shaft, said second sun gear wheel being connected to be driven by the power output shaft of said second turbine rotor, driving means connecting said planet carrier to drive said common power output shaft, said first sun gear wheel being smaller than said second sun gear wheel such that said power output shaft of said second turbine rotor will rotate slower than said drive shaft, and a second unidirectional clutch operatively arranged between said reaction member and said first sun gear wheel whereby the speed of the second turbine rotor will increase above the ratio dictated by the second gearing when said second unidirectional clutch freewheels, and a third unidirectional clutch operatively arranged between the second turbine rotor and the drive shaft to prevent the speed of the second turbine rotor from exceeding the speed of the drive shaft and consequently from exceeding the speed of the first turbine rotor.

7. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a planet carrier, a first sun gear wheel, a second sun gear wheel, a pair of unequal planet gear wheels supported by said planet carrier and meshing respectively with said first and said second sun gear wheels, means drivingly interconnecting said pair of unequal planet gear wheels, an annulus gear wheel meshing with one of said planet gear wheels, a first optionally-releasable brake means adapted to hold said annulus gear wheel rotatively-stationary, said first sun gear wheel being connected to be driven by said drive shaft, said second sun gear wheel being connected to be driven by the power output shaft of said second turbine rotor, optionally-releasable driving means connecting said planet carrier to drive said common power output shaft, a second optionally-releasable brake means for holding the planet carrier rotatively-stationary, said first brake means being engaged when said second brake means is released and said first brake means released when said second brake means is engaged, a second optionally-releasable driving means connecting said annulus gear wheel to drive said common power output shaft, said first driving means being engaged when said second driving means is released and said first driving means released when said second driving means is engaged, said second optionally-releasable driving means being arranged to connect said annulus gear wheel to drive said common power output shaft when said first brake means is released for providing a reverse drive to said common power output shaft, said first sun gear wheel being smaller than said second sun gear wheel such that said power output shaft of said second turbine rotor will rotate slower than said drive shaft, and a second unidirectional clutch operatively arranged between said reaction member and said first sun gear wheel whereby the speed of the second turbine rotor will increase above the ratio dictated by the second gearing when said second unidirectional clutch freewheels, and a third unidirectional clutch operatively arranged between the second turbine rotor and the drive shaft to prevent the speed of the second turbine rotor from exceeding the speed of the drive shaft and consequently from exceeding the speed of the first turbine rotor.

8. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a first gear train operatively connected between said drive shaft and said common power output shaft for said drive shaft to drive said common power output shaft for said drive shaft to drive said common power output shaft at one ratio, a second gear train operatively connected between the power output shaft of said second turbine rotor and said common power output shaft for said power output shaft of said second turbine rotor to drive said common power output shaft at a different ratio such that said power output shaft of said second turbine rotor will rotate slower than said drive shaft, and a second unidirectional clutch operatively arranged between said reaction member and the second gearing whereby the speed of the second turbine rotor will increase above the ratio dictated by the second gearing when said second unidirectional clutch freewheels, and a third unidirectional clutch operatively arranged between the second turbine rotor and the drive shaft to prevent the speed of the second turbine rotor from exceeding the speed of the drive shaft and consequently from exceeding the speed of the first turbine rotor.

9. The combination of a gas turbine engine and a power transmission system, including a compressor, a first turbine rotor capable of driving the compressor at its full capacity, a power output shaft, a second turbine rotor connected to drive the power output shaft, means supporting said first and said second turbine rotors for relative rotation, an overdrive epicyclic gearing connected to transmit drive from the first turbine rotor to the compressor, a reaction member in said first overdrive epicyclic gearing, a drive shaft connected to be driven by said reaction member, a first unidirectional clutch operatively arranged between said compressor and said first turbine rotor to prevent the first turbine rotor from rotating faster than the compressor, a common power output shaft, a first gear train connected to be driven by said drive shaft, a second gear train connected to be driven by the power output shaft of said second turbine rotor, a first optionally-releasable clutch means connecting said first and said second gear trains to drive said common power output shaft, said first gear train being arranged to drive said common power output shaft at one ratio and said second gear train being arranged to drive said common power output shaft at a different ratio such that said power output shaft of said second turbine rotor will rotate slower than said drive shaft, a second unidirectional clutch operatively arranged between said reaction member and the second gearing whereby the speed of the second turbine rotor will increase above the ratio dictated by the second gearing when said second unidirectional clutch freewheels, a third unidirectional clutch operatively arranged between the second turbine rotor and the drive shaft to prevent the speed of the second turbine rotor from exceeding the speed of the drive shaft and consequently from exceeding the speed of the first turbine rotor, a third gear train connected to be driven by said drive shaft, a second optionally-releasable clutch means connecting said third gear train to drive the common power output shaft, said first clutch means engaged when said second clutch means is released and said first clutch means released when said second clutch means is engaged, said third gear train providing a reverse drive to the common power output shaft from said drive shaft when said second clutch means is engaged, and said third unidirectional clutch providing a drive connection from the power output shaft of said second turbine motor to said drive shaft when said second clutch means is engaged whereby said third gear train provides a reverse drive from both the drive shaft and the power output shaft of said second turbine rotor to the common power output shaft.

No references cited.

JULIUS E. WEST, *Primary Examiner.*